UNITED STATES PATENT OFFICE.

EMILIO OLSSON, OF BUENOS AYRES, ARGENTINA.

INSECTICIDE.

963,932.  Specification of Letters Patent.  Patented July 12, 1910.

No Drawing.  Application filed June 11, 1909.  Serial No. 501,605.

*To all whom it may concern:*

Be it known that I, EMILIO OLSSON, a subject of the King of Sweden, residing at 25 de Mayo street 240, Buenos Ayres, Argentina, have invented certain new and useful Improvements in Insecticides, of which the following is a specification.

The present invention relates to a liquid insecticide which may be applied by spraying or other desirable means to all plants affected externally by insects, and particularly to such plants as are affected by the ravages of the locust.

The object of the invention is to produce a liquid composition of such character which will either kill all insects on the plants, or will emit an odor so offensive to insects that they will not settle on the plants treated; which can be preserved indefinitely without alteration in its qualities; which is harmless to the plant substance; and which acts as a fertilizer for the plants when the compound is washed onto the ground.

The liquid insecticide constituting the present invention consists of a decoction of the leaves of the plant botanically known as *Melia azedarach*, and known in many parts of South America as the *Paraiso*, which decoction is obtained by boiling said leaves with Chile saltpeter.

While the liquid insecticide may be compounded with the ingredients employed in various proportions, especially satisfactory results are attained when the ingredients are used in substantially the following proportions, to wit:—

| | |
|---|---|
| Chile saltpeter | 2 kilograms |
| Leaves of *Melia azedarach* | 1 kilogram |
| Water | 25 liters |

The liquid compound is prepared as follows: The *Paraiso* leaves are boiled in water in the proportionate quantities above stated for a period of 4 hours; the Chile saltpeter is then added in the proportionate quantity stated, and the whole is boiled for one hour more. The resulting product is then allowed to stand for 48 hours, and is then filtered, after which it is ready for use.

The liquid compound is applied by spraying or equivalent means to all kinds of plants which suffer from the ravages of insects. It is applied in quantities varying with the class of plants to which the insecticide is applied, but ordinarily is applied in such quantity that the greater part of the surface of the plant to be treated is slightly moistened with the compound. A valuable feature of the compound is that it serves as a fertilizer for the plants should any of it fall on the ground, or be washed off the leaves by rain. Its efficiency as an insecticide is not affected by long keeping, and it is not harmful to any variety of plant so far as is known.

The compound is particularly characterized by the fact that it emits an odor so objectionable to insects that they will not remain on any plant on which their presence is prejudicial.

I claim:—

An insecticide consisting of a solution of Chile saltpeter in an aqueous decoction of the leaves of *Melia azedarach* in about the proportions stated.

In testimony whereof I affix my signature in presence of two witnesses.

EMILIO OLSSON.

Witnesses:
 JOSÉ IG. GALLARDO,
 ALEJANDRO CARRAZZONI.